July 6, 1948.

J. H. RICHARDSON 2,444,533

METHOD OF MANUFACTURING REFLECTING
OPTICAL ELEMENTS

Filed March 7, 1946

INVENTOR
John H. Richardson
BY
Donald L. Brown
ATTORNEY

Patented July 6, 1948

2,444,533

UNITED STATES PATENT OFFICE 2,444,533

METHOD OF MANUFACTURING REFLECTING OPTICAL ELEMENTS

John H. Richardson, Needham, Mass., assignor to Polaroid Corporation, Cambridge, Mass., a corporation of Delaware Application March 7, 1946, Serial No. 652,832

5 Claims. (Cl. 18—59)

The present invention relates generally to improved methods of manufacturing optical elements.

The manufacture of precision glass optical elements is expensive and time consuming. The grinding and polishing operations necessary to produce optically smooth finished surfaces are slow and tedious, and are not susceptible to mass production methods. It has heretofore been proposed to form precision optical elements by applying a polymerizable coating to a base member having a surface thereof which approximates the contour of the finished optical surface of the element. The polymerizable coating is polymerized on the base member in contact with a mold having a smooth optically finished surface thereon which conforms exactly to the contour of the finished optical surface of the optical element. Such a procedure provides an optical element having a surface which is hard and which has the desired finished contour thereon. Under some conditions, however, checks and cracks may appear on the finished optical surface of the coating. Such checks or cracks are sometimes the result of strains set up in the coating because of the great difference of the linear coefficients of expansion of the coating and the base member. The checking and cracking sometimes may also be the result of shrinkage of the resin as it is being polymerized.

One object of the present invention is to provide an improved method of manufacturing precision optical elements whereby the above mentioned difficulties will be overcome. To this end and as illustrated, a glass mold member is coated with a monomer or, preferably, a partial polymer of a polymerizable composition, polymerizing said coating until the composition is completely polymerized, softening the exposed surface of the coating to render it tacky, coating said softened surface with a powdered material, hardening said surface to bond said powdered material to said coating, and molding a base or support on said coating to which said powdered material will adhere.

Still further objects are to provide new optical elements and methods of making the same.

Other objects and advantages will in part appear and in part be pointed out in the course of the following descriptions of the invention, which are given as non-limiting examples in connection with the accompanying drawings, in which.

Figure 4:
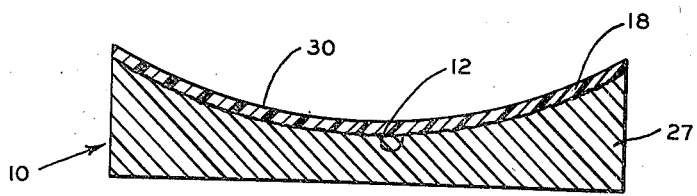
Fig. 4 is a view in section illustrating a finished optical element.

The optical element 10 shown in Fig. 4 of the drawings is provided with a concave spherical surface 12. The curvature of this surface, however, may be parabolic, hyperbolic, or of any other desired contour or curvature. The illustrated optically smooth finished element 10 is particularly adapted for use as a reflector in a Schmidt projection system, but it is apparent that it could also be used as a reflector for other purposes. These reflectors vary substantially in size and are usually from 6 to 14 inches in diameter, but they may, in some instances, be as small as two inches in diameter and as large as six or more feet in diameter.

The mold 14 having a convex optically smooth molding surface 16 thereon is formed of glass or other suitable material which may be ground and polished to provide a smooth optically finished molding surface. The mold 14 is coated with a monomer or partial polymer of a polymerizable composition such, for example, as styrene, orthochloro styrene, or other members of the styrene family. Other polymerizable compositions may be used, such as cyclohexyl methacrylate, methyl methacrylate, benzyl methacrylate and copolymers and interpolymers thereof. It is to be expressly understood, however, that all materials are contemplated which may be readily hardened by heat and which, when hardened in contact with the mold surface 16, form a coating which is hard and homogeneous and provides an optically smooth finished surface.

The coating 18 may be applied to the molding surface 16 of the mold by pouring a thin film of partially polymerized styrene thereon and allowing the surplus material to drain off. Preferably, however, the convex surface 16 of the mold is dipped into a bath of partial polymer of styrene. The viscosity of the partial polymer of styrene is approximately 10,000 centipoises and is normally heated to approximately 80° C. before the coating is applied to the mold 14. The mold is heated to a temperature of approximately 80° C., but it is evident that the mold temperature, as well as the temperature of the partial polymer, may be varied substantially, if so desired, but it is usually somewhere within the range of 20° to 80° C.

After the convex surface 16 of the mold 14 has been dipped in the bath of partial polymer, it is removed therefrom and placed with its convex surface 16 upwardly to permit the excess partial polymer to drain off. With a partial polymer of styrene of the viscosity set forth above and with the temperature of the mold and the temperature of the partial polymer of styrene at about 80° C., the layer of plastic resin on the convex surface will be approximately .005" thick. If a thicker coating is desired, the viscosity of the partial may be somewhat increased by further polymerization or by cooling.

Figure 1:
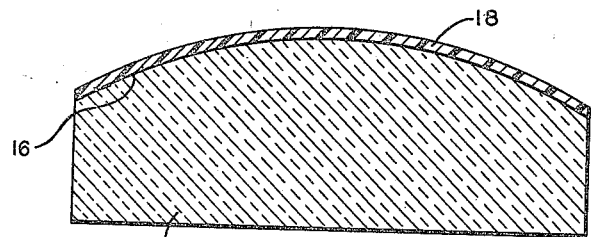
Figure 1 is a view in section of a glass mold having a thin coating of a polymerized composition.
Figure 2:
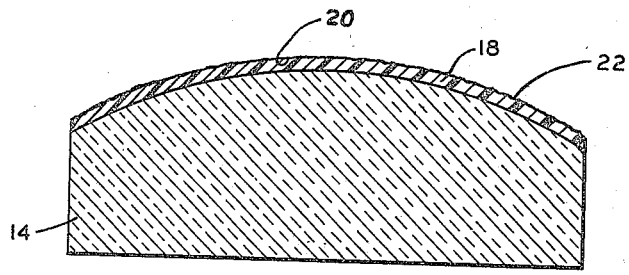
Fig. 2 is a view in section similar to Fig. 1, but showing the exposed surface of the coating softened and having a layer of powdered material applied thereto.

After the mold 14 is coated by either of the above mentioned methods, it is placed in an oven heated to approximately 80° C. and baked for approximately two hours until the plastic coating 18 is completely polymerized. The coated mold is then cooled and the excess resin beyond the edge of the convex optical surface 16 is trimmed off so that the coated mold is in the condition as shown in Fig. 1 of the drawings. After the mold with the coating thereon has been cooled to substantially room temperature, a monomer or partial polymer of styrene is applied to the exposed surface of the plastic coating 18. Enough of the monomer or partial polymer is applied to the outer surface of the plastic coating 18 to make the outer surface 20 of the coating 18 tacky. It is preferred to use a monomer of styrene for this purpose. It is evident that volatile solvents for polymerized styrene may be used which will make the outer surface thereof tacky, and which are sufficiently volatile to be removed either by exposure to the atmosphere or by baking at an elevated temperature.

A powdered mineral hydrate, such for example, as plaster of Paris or Portland cement, in other words a mineral cementitious material activated by water, is sprinkled in a thin uniform layer 22 upon the tacky surface 20 of the coating 18. Powdered plaster of Paris is bonded to the coating 18 by baking it at a temperature of approximately 80° C. for a period of approximately 20 minutes, which completely polymerizes the plastic or tacky portion of the coating. Instead of plaster of Paris, the thin uniform coating 22 may be of any other powdered mineral hydrate, for example, such as Portland cement. If a volatile solvent is used it is evident that the baking of the mold with the coating thereon may either be entirely dispensed with or the time required substantially reduced.

Figure 3:
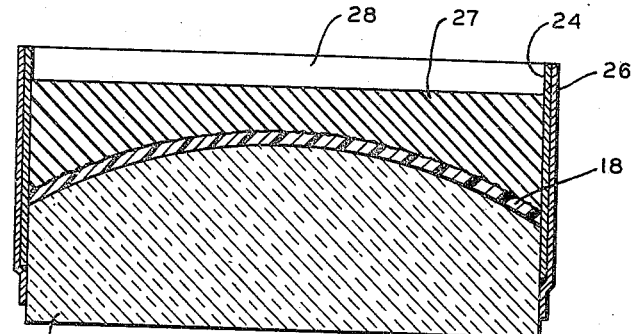
Fig. 3 is a view in section showing the relation between the mold and the base member.

After the mold 14 is removed from the oven and cooled, the excess resin extending beyond the convex surface of the mold is trimmed off and the mold wrapped, as shown in Fig. 3, with a strip of Cellophane 24, or any other material which will be unaffected by a water mixture of a mineral hydrate. The edges of the strip 24 extend substantially above the side of the mold and the strip 24 is held in place by adhesive tape, such for example, as scotch tape 26. This construction forms a water-tight cavity or receptacle into which a suitable mixture of a mineral hydrate and water can be poured.

The water and mineral hydrate mixture is poured into the cavity 28. The plaster of Paris or other mineral hydrate that is bonded to the plastic or tacky surface 20 of the coating 18 is wet by said mixture and forms an integral part of the backing 27 when the plaster of Paris sets. The powdered plaster of Paris is imbedded in the exposed surface of the plastic coating and the backing adheres strongly to the plastic coating 18.

Since the plastic coating 18 is already polymerized and the slurry of water and plaster of Paris hardens at room temperature, strains due to a difference in coefficients of expansion of the plastic and the backing are minimized. When the slurry has set and is dry, the entire optical element 10 including the plaster of Paris backing and the plastic coating 18 are separated as a unit from the mold 14 in the usual manner. After the optical element has been completely dried, the finished optical surface thereof is provided with a reflecting coating 30 which may be of silver, and which may be deposited thereon in any well known manner, or the reflecting coating may be formed by depositing a thin layer of evaporated aluminum thereon. After the reflecting coating 30 has been suitably polished, the optical element 10 is ready for use.

Since certain changes in the methods set forth which embody the invention may be made without departing from its scope, it is intended that all matter contained in the above described specification, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved method of manufacturing reflecting optical elements which comprises providing a mold member having an optically finished molding surface, forming a solid resin layer on said optically finished surface, treating the exposed surface of said layer to render it tacky, applying a thin layer of a powdered mineral cementitious material adapted to be activated by water to said tacky surface, causing said tacky surface to harden to bond said mineral cementitious material to the exposed surface of said resin layer, casting a water slurry of a mineral cementitious material on said resin layer and said powdered material on said resin layer and said powdered mineral cementitious material to form a base member and to bond said powdered material to said base member and thus bond said resin layer to said base, and removing the thus formed element from said molding surface as a unitary mass.

2. An improved method of manufacturing reflecting optical elements which comprises providing a mold member having an optically finished molding surface, polymerizing a solid resin layer on said optically finished surface to form a hard homogeneous coating, treating the exposed surface of said resin layer to render it tacky, applying a thin layer of a powdered mineral cementitious material adapted to be activated by water to said tacky surface, causing said tacky surface to harden to bond said mineral cementitious material to the exposed surface of said resin layer, casting a water slurry of a mineral cementitious material on said resin layer and said powdered mineral cementitious material to form a base member and to bond said powdered material to said base member and thus bond said resin layer to said base, and removing the thus formed element from said molding surface as a unitary mass.

3. An improved method of manufacturing reflecting optical elements which comprises providing a mold member having an optically finished molding surface, coating said optically finished surface with a polymerizable liquid material, polymerizing said coating to form a hard homogeneous layer having an optically smooth surface conforming precisely to the contour of the molding surface, treating the exposed surface of said layer to render it tacky, applying a thin layer of powdered plaster of Paris to said tacky surface, causing said tacky surface to harden to bond said powdered plaster of Paris to said layer, casting a mixture of plaster of Paris and water on said layer and said powdered plaster of Paris to form a base member and to bond said powdered plaster of Paris to said base member and thus bond said polymerized layer to said base, removing the thus formed element from said molding surface as a unitary mass, and applying a thin reflecting coating to the optically smooth surface of the polymerized layer.

4. An improved method of manufacturing reflecting optical elements which comprises providing a mold member having an optically finished molding surface, coating said optically finished surface with a liquid partial polymer of styrene, completely polymerizing the styrene coating to form a hard homogeneous layer of polymerized styrene having an optically smooth surface conforming precisely to the contour of the molding surface, treating the exposed surface of said styrene layer to render it tacky, applying a thin layer of powdered plaster of Paris to said tacky surface, causing said tacky surface to harden to bond said powdered plaster of Paris to said styrene layer, casting a mixture of plaster of Paris and water on said styrene layer and said powdered plaster of Paris to form a base member and to bond said powdered plaster of Paris to said base member and thus bond said styrene layer to said base, and removing the thus formed element from said molding surface as a unitary mass.

5. An improved method of manufacturing reflecting optical elements which comprises providing a mold member having an optically finished surface, coating said optically finished surface with a liquid partial polymer of styrene, completely polymerizing the styrene coating to form a hard homogeneous layer of polymerized styrene having an optically smooth surface conforming precisely to the contour of the molding surface, applying a monomer of styrene to the exposed surface of said styrene layer to render it tacky, applying a thin layer of powdered plaster of Paris to said tacky surface, polymerizing said monomer of styrene to bond said powdered plaster of Paris to said styrene layer, casting a mixture of plaster of Paris and water on said styrene layer and said powdered plaster of Paris to form a base member and to bond said powdered plaster of Paris to said base member and thus bond said styrene layer to said base, removing the thus formed element from said molding surface as a unitary mass, and applying a thin reflecting coating to the optically smooth surface of the polymerized styrene layer.

JOHN H. RICHARDSON.

REFERENCES CITED

The following references are of record in the file of this patent:

UNITED STATES PATENTS

| Number | Name | Date |
|---|---|---|
| 1,094,828 | Aylesworth | Apr. 28, 1914 |
| 1,515,150 | Copeman | Nov. 11, 1924 |
| 2,339,433 | Staehle | Jan. 18, 1944 |
| 2,369,758 | Sheldon | Feb. 20, 1945 |

FOREIGN PATENTS

| Number | Country | Date |
|---|---|---|
| 482,836 | Great Britain | Apr. 5, 1938 |